United States Patent
Yamakoshi et al.

(10) Patent No.: US 8,686,705 B2
(45) Date of Patent: Apr. 1, 2014

(54) CURRENT MODE SYNCHRONOUS RECTIFICATION DC/DC CONVERTER

(75) Inventors: Haruo Yamakoshi, Kyoto (JP);
Hirotaka Nakabayashi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 72 days.

(21) Appl. No.: 13/302,002

(22) Filed: Nov. 22, 2011

(65) Prior Publication Data

US 2012/0126772 A1    May 24, 2012

(30) Foreign Application Priority Data

Nov. 22, 2010   (JP) .................................. 2010-259775

(51) Int. Cl.
*G05F 1/40*  (2006.01)
*G05F 1/44*  (2006.01)

(52) U.S. Cl.
USPC ............ 323/284; 323/282; 323/285; 323/286

(58) Field of Classification Search
USPC .................................. 323/282, 284, 285, 286
See application file for complete search history.

(56) References Cited

U.S. PATENT DOCUMENTS

| 2006/0220631 | A1* | 10/2006 | Ito | 323/283 |
| 2007/0182396 | A1* | 8/2007 | Inatomi | 323/283 |
| 2008/0197821 | A1* | 8/2008 | Hasegawa et al. | 323/238 |
| 2008/0278129 | A1* | 11/2008 | Shimizu | 323/282 |
| 2009/0039851 | A1* | 2/2009 | Fukushi et al. | 323/283 |

FOREIGN PATENT DOCUMENTS

WO     2007/036995     4/2007

\* cited by examiner

*Primary Examiner* — Bao Q Vu
(74) *Attorney, Agent, or Firm* — Fish & Richardson P.C.

(57) ABSTRACT

A current mode synchronous rectification direct current (DC)/DC converter according to the present invention includes: a soft start function unit (in FIG. 1, a reference voltage generation unit (104) enabling a reference voltage REF to slowly increase while starting), for inhibiting a target value of an output voltage VO to be lower than that at a normal action while starting; and an output stabilization function unit (in FIG. 1, a frequency variable type oscillator (110A) generating a clock signal CLK and a slope voltage SLOPE through an oscillation frequency corresponding to a reference voltage REF), for performing at least one of waiting for start of a switching action and reduction of a drive frequency while starting.

12 Claims, 6 Drawing Sheets

US 8,686,705 B2

CURRENT MODE SYNCHRONOUS RECTIFICATION DC/DC CONVERTER

BACKGROUND OF THE INVENTION

1. Field of the Invention

The present invention relates to a current mode synchronous rectification DC/DC converter that generates a required output voltage from an input voltage.

2. Description of the Related Art

The switching type DC/DC converter (also known as switching regulator) has been widely used for a long time as a reasonably efficient regulated power supply with limited thermal loss in applications where there is a clear, substantial difference between input and output. Such a device operates by driving an energy storage element (a capacitor or an inductor) through turn-on/turn-off control (power (duty) control) of an output transistor, so as to generate a required output voltage from an input voltage.

In addition, for a switching type DC/DC converter requiring a high conversion efficiency, a synchronous rectification manner is commonly adopted to greatly reduce a turn-on resistance of a rectification element; that is, a synchronous rectification transistor rather than a diode is used as a rectification element, and output transistors perform turn-on/him-off control thereon complementarily (exclusively).

Also, for a switching type DC/DC converter requiring a high response characteristic for load variations, a current mode control manner is adopted, in which a current feedback circuit is further included in addition to a voltage feedback circuit.

FIG. 8 is a block diagram of a conventional example of current mode synchronous rectification DC/DC converter. The DC/DC converter in this conventional example has the following structure: a voltage feedback circuit, for generating an error voltage ERR corresponding to a difference between a feedback voltage FB (in FIG. 8, a divided voltage of an output voltage VO) and a reference voltage REF; and a current feedback circuit, for generating and outputting a current detection voltage IDET corresponding to a current I (in FIG. 8, a high-end current flowing through an output transistor 201); and, feedback control with two circuits is adopted to perform complementary (exclusive) turn-on/turn-off control on the output transistor 201 and the synchronous rectification transistor 202. More specifically, in the conventional example, the DC/DC converter performs the following functions: generating a Pulse Width Modulation (PWM) signal PWM having a power corresponding to a comparison result of the error voltage ERR and a slope voltage SLOPE or a current detection voltage IDET, and performing complementary (exclusive) turn-on/turn-off control on the output transistor 201 and the synchronous rectification transistor 202 according to the PWM signal (PWM).

Also, the DC/DC converter in the conventional example, as a mechanism for preventing a rush current while starting and having a soft start function. More specifically, to prevent the generated error voltage ERR from becoming too large while starting, the DC/DC converter in this conventional example has the following way, that is, after an enable signal EN is switched to a logic level (a high level in FIG. 8) allowed for driving, the reference voltage REF slowly increases (referring to FIG. 9).

In addition, as an example in the prior art related to the present invention, a patent document 1 is given (an electronic stabilizer capable of adjusting light for electrodeless discharge lamp disposed with a start circuit of a drive frequency of a scanning inverter circuit).

PATENT DOCUMENT

Patent document 1: International Publication No. 2007/036995 Pamphlet

SUMMARY OF THE INVENTION

Problem to be Solved by the Invention

The conventional current mode synchronous rectification DC/DC converter is indeed capable of preventing a rush current while starting with the soft start function.

However, the conventional DC/DC converter has the following problem: in a period until a voltage value of a reference voltage REF reaches a stable action area i.e., a target value of an output voltage VO capable of stable output in a state of setting a power of a PWM signal (PWM) to a minimum value, an output voltage VO fluctuates (referring to FIG. 9).

The present invention addresses problems found by the inventor of the present invention, and its objective is to provide a current mode synchronous rectification DC/DC converter capable of inhibiting fluctuations of an output voltage while starting.

Technical Means to Solve the Problems

To achieve the objective, the current mode synchronous rectification DC/DC converter of the present invention has a first structure that includes the following: a soft start function unit, for inhibiting a target value of an output voltage to be lower than that at a normal action while starting; and an output stabilization function unit, for performing at least one of waiting for start of a switching action and reduction of a drive frequency while starting.

In addition, the current mode synchronous rectification DC/DC converter including the first structure may also have a second structure that includes the following: an output transistor and a synchronous rectification transistor, for generating the output voltage from an input voltage according to turn-on/turn-off control thereof complementary to each other; a reference voltage generation unit, for generating specific reference voltage; an error amplifier, for amplifying a difference between a feedback voltage corresponding to the output voltage and the reference voltage and generating an error voltage; a current detection unit, for generating a current detection voltage corresponding to the output current; an oscillator, for generating a clock signal and a slope voltage with the same oscillation frequency; a PWM comparator, for generating a PWM signal according to a comparison result of the error voltage and the slope voltage and a comparison result of the error voltage and the current detection voltage; an RS trigger, for generating a latch signal set through the clock signal and reset through the PWM signal; and a driver, for generating gate voltages of the output transistor and the synchronous rectification transistor according to the latch signal.

Also, the current mode synchronous rectification DC/DC converter including the second structure may also have a third structure, wherein the reference voltage generation unit, as the soft start function unit, enables the reference voltage to slowly increase while starting.

Also, the current mode synchronous rectification DC/DC converter including the third structure may also have a fourth structure, wherein the oscillator, as the output stabilization function unit, generates the clock signal and the slope voltage through an oscillation frequency corresponding to the reference voltage.

Also, the current mode synchronous rectification DC/DC converter including the fourth structure may also have a fifth structure, wherein the oscillator includes: an amplification unit, for generating a first voltage acquired by amplifying the reference voltage; an offset setting unit, for enabling the first voltage to produce an offset, thereby generating a second voltage; a band gap voltage generation unit, for generating a band gap voltage; a buffer, for generating a third voltage in the same manner as a lower one of the second voltage and the band gap voltage; a voltage/current conversion unit, for converting the third voltage into a current signal; a ring oscillator, for generating the clock signal through an oscillation frequency corresponding to the current signal; and a slope voltage generation unit, for generating the slope voltage from the clock signal.

Also, the current mode synchronous rectification DC/DC converter including the fifth structure may also have a sixth structure, wherein the voltage/current conversion unit includes an npn type bipolar transistor. A base of the npn type bipolar transistor is connected to an output terminal of to the buffer, an emitter is grounded through a resistor, and a collector is connected to the ring oscillator.

Also, the current mode synchronous rectification DC/DC converter including any structure in the third technical solution to the sixth technical solution may also have a seventh structure, that includes a mask circuit, which, as the output stabilization function unit, masks the error voltage in a period when the reference voltage reaches a specific threshold voltage.

Also, the current mode synchronous rectification DC/DC converter including the seventh structure may also have an eighth structure, wherein the mask circuit includes: a threshold voltage generation unit, for generating the threshold voltage; a comparator, for comparing the reference voltage with the threshold voltage; and a transistor, for enabling turn-on/turn-off between an output terminal and a grounding terminal of the error amplifier according to an output of the comparator.

Also, the current mode synchronous rectification DC/DC converter including any structure in the first technical solution to the eighth technical solution may also have a ninth structure, wherein the current detection unit includes: a switch, having a terminal connected to a connection node between the output transistor and the synchronous rectification transistor, and the other terminal connected to an output terminal of the current detection voltage; and a pull up resistor, having a terminal connected to an output terminal of the current detection voltage, and the other terminal connected to an application terminal of a power supply voltage.

Also, the current mode synchronous rectification DC/DC converter including any structure in the first technical solution to the ninth technical solution may also have a tenth structure that includes: an inductor, having a terminal connected to a connection node between the output transistor and the synchronous rectification transistor, and the other terminal connected to an output terminal of the output voltage; and a capacitor, having a terminal connected to an output terminal of the output voltage, and the other terminal connected to a grounding terminal; in which the input voltage is reduced to generate the output voltage.

Effect of the Invention

According to the present invention, a current mode synchronous rectification DC/DC converter capable of inhibiting fluctuations of an output voltage while starting can be provided.

BRIEF DESCRIPTION OF THE DRAWINGS

The invention will be described according to the appended drawings in which.

LIST OF REFERENCE NUMERALS

Figure 1:
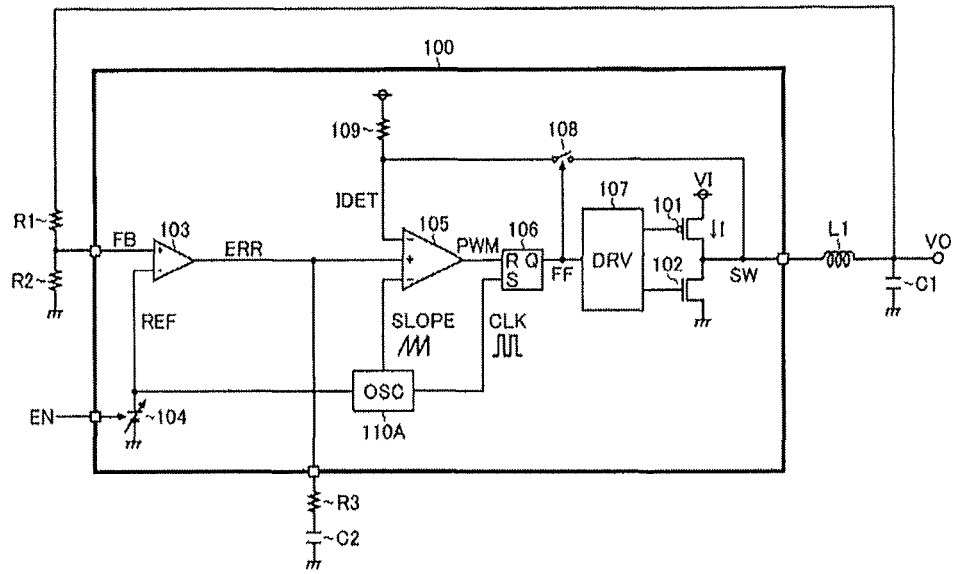
FIG. 1 is a block diagram of a current mode synchronous rectification DC/DC converter according to a first embodiment.

100 Semiconductor device
101 Output transistor (P-channel type metal-oxide-semiconductor (MOS) field effect transistor)
102 synchronous rectification transistor (N-channel type MOS field effect transistor)
103 Error amplifier
104 Reference voltage generation unit
105 PWM comparator
106 RS trigger
107 Driver
108 Switch
109 Pull up resistor
110A Oscillator (frequency variable type)
110B Oscillator (frequency fixed type)
111 Comparator
112 Threshold voltage generation unit
113 N-channel type MOS field effect transistor
L1 Inductor
C1, C2 Capacitors
R1-R3 Resistors
A1 Operational amplifier
A2 Offset setting unit
A3 Band gap voltage generation unit
A4 Operational amplifier
A5 npn type bipolar transistor
A6 Ring oscillator
A7 Slope voltage generation unit
A8-A10 Resistors

PREFERRED EMBODIMENT OF THE PRESENT INVENTION

First Embodiment

FIG. 1 is a block diagram of a current mode synchronous rectification DC/DC converter according to a first embodiment of the present invention. The current mode synchronous rectification DC/DC converter in the embodiment is formed by using a semiconductor device 100 (a so-called switching power supply integrated circuit (IC)), an inductor L1 hung externally thereon, capacitors C1 and C2, and resistors R1-R3, so an input voltage V1 is reduced to generate a required output voltage VO.

In the semiconductor device 100, an output transistor 101, a synchronous rectification transistor 102, an error amplifier 103, a reference voltage generation unit 104, a PWM comparator 105, an RS trigger 106, a driver 107, a switch 108, a pull up resistor 109, and an oscillator 110A are integrated. In addition, in the semiconductor device 100, in addition to the circuit elements, other protection circuits (such as a low input faulty action prevention circuit or a temperature protection circuit) may also be properly added.

A terminal of the inductor L1 is connected to a connection node between the output transistor 101 and the synchronous rectification transistor 102. The other terminal of the inductor L1 is connected to an output terminal of the output voltage VO. A terminal of the capacitor C1 is connected to an output terminal of the output voltage VO. The other terminal of the capacitor C1 is connected to a grounding terminal. That is to say, the inductor L1 and the capacitor C1 form an LC smoothing circuit, and the LC smoothing circuit makes a switch voltage SW which occurs at the connection node between the output transistor 101 and the synchronous rectification transistor 102 smooth to generate an output voltage VO.

The resistors R1 and R2 are connected between an output terminal and a grounding terminal of an output voltage VO in series, and the connection node thereof, as an outlet terminal of the feedback voltage FB (a divided voltage of the output voltage VO), is connected to a non-inverted input terminal (+) of the error amplifier 103. That is to say, the resistors R1 and R2 form a resistance voltage division circuit for performing voltage division on the output voltage VO and generating a feedback voltage FB.

The resistor R3 and the capacitor C2 are connected between an output terminal and a grounding terminal of the error amplifier 103 in series. That is to say, the resistor R3 and the capacitor C2 form a phase compensation circuit of an error amplifier 103.

The output transistor 101 and the synchronous rectification transistor 102 generate an output voltage VO from an input voltage V1 according to turn-on/turn-off control thereof complementary (exclusive) to each other. In addition, the term "complementary (exclusive)" used in this specification, in addition to a case in which the turn-on/turn-off states of the output transistor 101 and the synchronous rectification transistor 102 are completely inverted, also includes the other case in which a turn-on/turn-off transition sequence of the output transistor 101 and the synchronous rectification transistor 102 is endowed with a specific delay seen from the point of preventing the through current.

A source of the output transistor 101 is connected to an application terminal of the input voltage V1. A drain of the output transistor 101 is connected to a terminal of the inductor L1. A gate of the output transistor 101 is connected to a driver 107. A source of the synchronous rectification transistor 102 is connected to a grounding terminal. A drain of the synchronous rectification transistor 102 is connected to a terminal of the inductor L1. A gate of the synchronous rectification transistor 102 is connected to the driver 107.

The error amplifier 103 amplifies a difference between the feedback voltage FB corresponding to the output voltage VO and a reference voltage REF and generates an error voltage ERR. A non-inverted input terminal (+) of the error amplifier 103 is connected to an application terminal of the feedback voltage FB. An inverted input terminal (−) of the error amplifier 103 is connected to an application terminal of the reference voltage REF. An output terminal of the error amplifier 103 is connected to a non-inverted input terminal (+) of the PWM comparator 105, and is also connected to the grounding terminal through the resistor R3 and the capacitor C2.

The reference voltage generation unit 104 generates a reference voltage REF equivalent to a target value of an output voltage VO and outputs the reference voltage REF to an inverted input terminal (−) of the error amplifier 103. Also, in the current mode synchronous rectification DC/DC converter in this embodiment, a reference voltage generation unit 104 has the following structure: when the DC/DC converter is started (for example, high level transition of an enable signal EN), the reference voltage REF is enabled to slowly increase from a zero value. By adopting such a structure, the reference voltage generation unit 104 exerts the function as a soft start function unit which inhibits a target value (=a reference voltage REF) of the output voltage VO to be lower than that at a normal action when the DC/DC converter is started.

The PWM comparator 105, according to a comparison result of the error voltage ERR and the slope voltage SLOPE and a comparison result of the error voltage ERR and the current detection voltage IDET, generates a PWM signal (PWM). A non-inverted input terminal (+) of the PWM comparator 105 is connected to an application terminal (an output terminal of the error amplifier 103) of the error voltage ERR. A first inverted input terminal (−) of the PWM comparator 105 is connected to an application terminal (a first output terminal of the oscillator 110A) of the slope voltage SLOPE. A second inverted input terminal (−) of the PWM comparator 105 is connected to an application terminal (a connection node between the switch 108 and the pull up resistor 109) of the current detection voltage IDET. An output terminal of the PWM comparator 105 is connected to a reset input terminal (R) of the RS trigger 106.

The RS trigger 106 generates a latch signal FF set through a clock signal CLK and reset through a PWM signal (PWM). A set input terminal (S) of the RS trigger 106 is connected to an application terminal (a second output terminal of the oscillator 110A) of the clock signal CLK. A reset input terminal (R) of the RS trigger 106 is connected to an application terminal (an output terminal of the PWM comparator 105) of the PWM signal (PWM). An output terminal (Q) of the RS trigger 106 is connected to the driver 107, and also connected to a control terminal of the switch 108.

The driver 107, according to the latch signal FF, respectively generates gate voltages of the output transistor 101 and the synchronous rectification transistor 102, so as to enable complementary (exclusive) turn-on/turn-off of the output transistor 101 and the synchronous rectification transistor 102.

A terminal of the switch 108 is connected to an application terminal (a connection node of the output transistor 101 and the synchronous rectification transistor 102) of the switch voltage SW. The other terminal of the switch 108, as an output terminal of the current detection voltage IDET, is connected to a second inverted input terminal (−) of the PWM comparator 105. A control terminal of the switch 108 is connected to an application terminal (an output terminal of the RS trigger 106) of the latch signal FF. That is, the switch 108 is under switching control synchronous with the output transistor 101. More specifically, the switch 108 is turned on when the output transistor 101 is turned on, and turned off when the output transistor 101 is turned off. A terminal of the pull up resistor 109, as an output terminal of the current detection voltage IDET, is connected to a second inverted input terminal (−) of the PWM comparator 105. The other terminal of the pull up resistor 109 is connected to an application terminal of the power supply voltage VCC. Therefore, the current detection voltage IDET is consistent with the switch voltage SW when the output transistor 101 is turned on, and is consistent with the power supply voltage VCC when the output transistor 101 is turned off. Therefore, the switch 108 and the pull up resistor 109 form a current detection unit. The current detection unit generates a current detection voltage IDET (equivalent to the switch voltage SW obtained when the output transistor 101 is turned on) corresponding to an output current I flowing in the output transistor 101. In addition, this embodiment illustrates a structure in which an output current I flowing in the output transistor 101 is monitored. However, the structure of the present invention is not limited thereto. The structure may also be formed, such that an inductive current flowing in the inductor L1 or a load current in the flowing in load is monitored.

The oscillator 110A generates a rectangular waveform clock signal CLK and a saw-shaped slope voltage SLOPE with the same oscillation frequency fa. Also, in the current mode synchronous rectification DC/DC converter in this embodiment, the oscillator 110A is set to a frequency variable type which generates a clock signal CLK and a slope voltage SLOPE through an oscillation frequency fa corresponding to the reference voltage REF. By adopting such a structure, the oscillator 110A exerts the function as an output stabilization function unit which performs reduction of a drive frequency of the switching actions when the DC/DC converter is started. In addition, the circuit structure and specific actions of the oscillator 110A are illustrated below in detail.

First, a basic action (a DC/DC conversion action) of the current mode synchronous rectification DC/DC converter including the structure is illustrated.

The error amplifier 103 amplifies a difference between the feedback voltage FB and the reference voltage REF and generates an error voltage ERR. The PWM comparator 105 compares the error voltage ERR with the slope voltage SLOPE to generate a PWM signal (PWM). At this time, if the error voltage ERR is higher than a high level of the slope voltage SLOPE, then the logic level of the PWM signal (PWM) is a high level; otherwise, the logic level is a low level. That is, as the level of the error voltage ERR gets higher, the duration of the high level occupied in one period of the PWM signal (PWM) is longer; in contrast, as the level of the error voltage ERR gets lower, the duration of the high level occupied in one period of the PWM signal (PWM) becomes shorter.

Also, in the PWM comparator 105, a current detection voltage IDET corresponding to the output current I is input, so as to form a multiple feedback circuit combined by the voltage feedback circuit and the current feedback circuit. After the output transistor 101 is turned on, as the output current I increases, a voltage drop (=the output current I×a turn-on resistance Ron of the output transistor 101) in the output transistor 101 also increases, and the current detection voltage IDET is reduced. Here, if the current detection voltage IDET is lower than the error voltage ERR, the PWM signal (PWM) becomes a low level instantly, and the output transistor 101 is turned off. Subsequently, if the latch signal FF is set again through the clock signal CLK, the PWM signal (PWM) becomes a high level and the output transistor 101 is turned on.

The driver 107, according to the latch signal FF, respectively generates gate voltages of the output transistor 101 and the synchronous rectification transistor 102, so as to enable complementary (exclusive) turn-on/turn-off of the output transistor 101 and the synchronous rectification transistor 102.

Therefore, in the current mode synchronous rectification DC/DC converter, according to a monitoring result of the output voltage VO and the output current I, turn-on/turn-off control is performed on the output transistor 101 and the synchronous rectification transistor 102. Therefore, even in the case that the error voltage ERR fails to follow steep load variations, the turn-on/turn-off control may also be performed on the output transistor 101 and synchronous rectification transistor 102 according to a monitoring result of the output current I flowing in transistor 101, so as to effectively inhibit the variations of the output voltage VO. That is, the current mode synchronous rectification DC/DC converter does not need to make the capacitor C1 have a large capacity, so unnecessary increases in cost or size of the capacitor C1 can be avoided.

Next, soft start control of the current mode synchronous rectification DC/DC converter is described below Right after the DC/DC converter is started, the output voltage VO is zero, so the error voltage ERR becomes very large, the power of the PWM signal (PWM) becomes too large, and an excessively large rush current flows in the inductor L1 or the capacitor C1.

Therefore, in the current mode synchronous rectification DC/DC converter in this embodiment, the reference voltage generation unit 104 has the following structure: when the DC/DC converter is started, the reference voltage REF is enabled to slowly increase from a zero value. By adopting such a structure, the error voltage ERR may be prevented from becoming too large, so as to increase the power of the PWM signal (PWM) gradually, thereby preventing rush current flowing to the inductor L1 or capacitor C1.

Subsequently, the output stabilization control when the current mode synchronous rectification DC/DC converter is started is illustrated.

Figure 2:
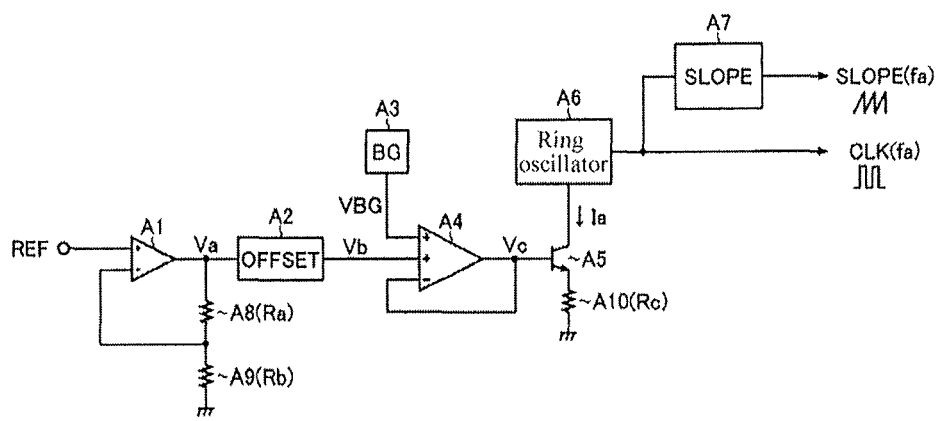
FIG. 2 is a circuit diagram of a structure example of an oscillator 110A.

FIG. 2 is a circuit diagram of a structure example of an oscillator 110A. As shown in FIG. 2, the oscillator 110A in this structure example includes: an operational amplifier A1, an offset setting unit A2, a band gap voltage generation unit A3, an operational amplifier A4, an npn type bipolar transistor A5, a ring oscillator A6, a slope voltage generation unit A7, a resistor A8 (a resistance value: Ra), a resistor A9 (a resistance value: Rb), and a resistor A10 (a resistance: Rc).

A non-inverted input terminal (+) of the operational amplifier A1 is connected to an application terminal of the reference voltage REF. An inverted input terminal (−) of the operational amplifier A1 is connected to a connection node of the resistor A8 and the resistor A9. An output terminal of the operational amplifier A1 is connected to an input terminal of the offset setting unit A2. That is, the operational amplifier A1 and the resistors A8 and A9 form an amplification unit. The amplification unit generates a first voltage Va (={(Ra+Rb)/Rb}× REF) obtained by amplifying a reference voltage REF.

The offset setting unit A2 enables the first voltage Va to produce a negative offset Voffset, thereby generating a second voltage Vb (=Va−Voffset, in which Vb≥0). In addition, the offset Voffset may also be set according to the duration in which the oscillation frequencies fa of the clock signal CLK and the slope voltage SLOPE are intended to be kept at minimum values.

The band gap voltage generation unit A3 generates a fixed band gap voltage VBG independent from power supply variations or the ambient temperature.

A first non-inverted input terminal (+) of the operational amplifier A4 is connected to an application terminal of the band gap voltage VBG. A second non-inverted input terminal (+) of the operational amplifier A4 is connected to an application terminal of the second voltage Vb. An inverted input terminal (−) of the operational amplifier A4 is connected to an output terminal (an output terminal of the third voltage Vc) of the operational amplifier A4. That is, the operational amplifier A4 forms a buffer, and the buffer generates a third voltage Vc in the same manner as a lower one of the second voltage Vb and the band gap voltage VBG.

The base of the transistor A5 is connected to an output terminal of the operational amplifier A4. An emitter of the transistor A5 is connected to a grounding terminal through the resistor A10. A collector of the transistor A5 is connected to a ring oscillator A6, and flows a current signal Ia (={Vc−Vth(A5)}/Rc) for setting an oscillation frequency fa. That is, the transistor A5 and the resistor A10 form a voltage/current conversion unit. The voltage/current conversion unit converts the third voltage Vc into a current signal Ia. In addition, a bipolar transistor rather than MOS field effect transistor is used as the transistor of the voltage/current conversion unit, thereby reducing uneven elements and performing voltage/current conversion with a greater precision.

The ring oscillator A6 generates a clock signal CLK through an oscillation frequency fa directly proportional to the current signal Ia. In addition, for the duration until the third voltage Vc reaches a turn-on threshold voltage Vth(A5) of the transistor A5, the transistor A5 is turned off, so the current signal Ia supplied to the ring oscillator A6 becomes a zero value. During this time, the ring oscillator A6 oscillates at a specific minimum frequency.

The slope generation unit A7 generates a slope voltage SLOPE from a clock signal CLK. Therefore, a clock signal CLK and a slope voltage SLOPE can be generated at the same oscillation frequency fa.

Figure 3:
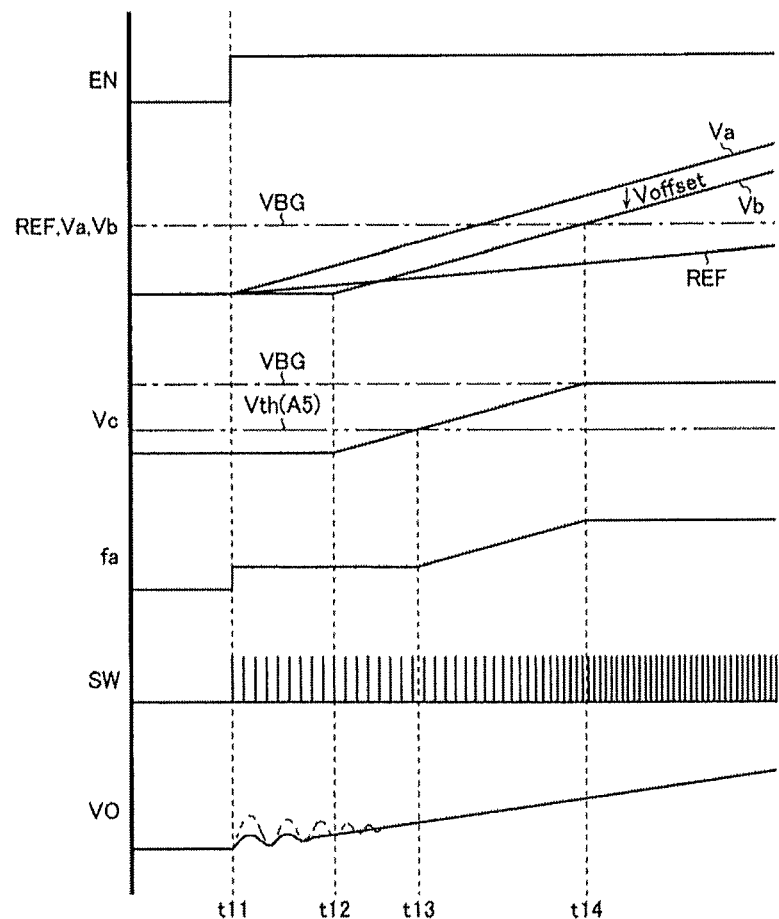
FIG. 3 is a sequence diagram of a start waveform according to the first embodiment.

FIG. 3 is a sequence diagram of a start waveform according to a first embodiment. Starting from the top, the actions of an enable signal EN, a reference voltage REF, a first voltage Va, a second voltage Vb, a third voltage Vc, an oscillation frequency fa, a switch voltage SW, and an output voltage VO are illustratively represented in sequence.

At time t11, if the enable signal EN is transitioned to a high level (a logic level when the action is allowed), the reference voltage REF in the reference voltage generation unit 104 starts to increase, and the first voltage Va in the oscillator A1 starts to increase. On the other hand, the second voltage Vb is only reduced by a negative offset Voffset from the first voltage Va, so the zero value is kept. At this time point, the second voltage Vb is lower than the band gap voltage VBG, and the second voltage Vb(=0 V) is output as the third voltage Vc. Therefore, the transistor A5 is turned off, and no current signal Ia flows in the ring oscillator A6, so that the oscillation frequencies fa of the clock signal CLK and the slope voltage SLOPE (further the oscillation frequency of the switch voltage SW) are set to specific minimum values.

At time t11, the first voltage Va starts to increase; at time t12, if an absolute value of the first voltage Va is greater than an absolute value of the offset voltage Voffset, the second voltage Vb starts to increase. However, for the duration until the third voltage Vc (=second voltage Vb) exceeds a turn-on threshold voltage Vth(A5) of the transistor A5, the transistor A5 is turned off, and no flow current signal Ia flows in the ring oscillator A6, so that the oscillation frequencies fa of the clock signal CLK and the slope voltage SLOPE continue to be set to specific minimum values.

At time t12, the second voltage Vb starts to increase; at time t13, if the third voltage Vc (=a second voltage Vb) exceeds the turn-on threshold voltage Vth(A5) of the transistor A5, so the conduction degree of the transistor A5 gradually increases. Therefore, after time t13, the current signal Ia supplied to the ring oscillator A6 gradually increases, so that the oscillation frequencies fa of the clock signal CLK and the slope voltage SLOPE gradually increase.

At time t13, the oscillation frequency fa starts to increase; at time t14, if the second voltage Vb exceeds the band gap voltage VBG, the band gap voltage VBG is output as the third voltage Vc. Therefore, after time t14, the current signal Ia supplied to the ring oscillator A6 is fixed at a current value (={VBG−Vth(A5)}/Rc) corresponding to the band gap voltage VBG, so that the oscillation frequencies fa of the clock signal CLK and the slope voltage SLOPE are fixed at oscillation frequencies (that is, oscillation frequencies at a normal action) corresponding to the band gap voltages VBG.

In this manner, the first embodiment adopts the following structure: for the soft start duration of the current mode synchronous rectification DC/DC converter, after the start with an oscillation frequency fa lower than that at a normal action, the oscillation frequency fa is gradually increased. According to such a structure, fluctuations of the output voltage VO that occur when the reference voltage REF is relatively low can be effectively inhibited, so that the output voltage VO may be transitioned to a stable state more rapidly.

Second Embodiment

Figure 4:
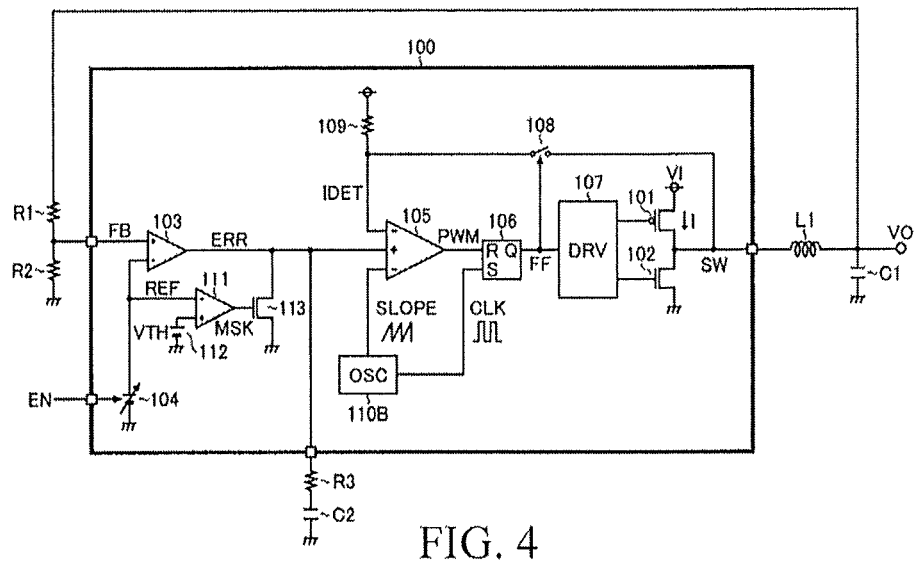
FIG. 4 is a block diagram of a current mode synchronous rectification DC/DC converter according to a second embodiment.

FIG. 4 is a block diagram of a current mode synchronous rectification DC/DC converter according to a second embodiment. The basic structure of the second embodiment is the same as that of the first embodiment same, so for circuit elements the same as those in the first embodiment, the same symbols as those in FIG. 1 are marked and repeated illustration is omitted. The circuit elements special to the second embodiment are illustrated explicitly below.

First, the current mode synchronous rectification DC/DC converter in the second embodiment has a frequency fixed type oscillator 110B to replace the frequency variable type oscillator 110A. The oscillator 110B has the circuit structure obtained by removing the operational amplifier A1, the offset setting unit A2, and the resistors A8 and A9 among the circuit elements that form the oscillator 110A in FIG. 2.

Also, the current mode synchronous rectification DC/DC converter in the second embodiment has a mask circuit (a comparator 111, a threshold voltage generation unit 112, and an N-channel type MOS field effect transistor 113) used as an output stabilization function unit that performs waiting for start of a switching action while starting, and the mask circuit masks the error voltage ERR for the duration until the reference voltage REF reaches a specific threshold voltage VTH.

The comparator 111 compares the reference voltage REF applied to the inverted input terminal (−) with the threshold voltage VTH applied to the non-inverted input terminal (+), and generates a mask signal MSK. The mask signal MSK becomes a high level when the reference voltage REF is lower than a threshold voltage VTH, and becomes a low level when the reference voltage REF is higher than the threshold voltage VTH.

The threshold voltage generation unit 112 generates a threshold voltage VTH and applies the threshold voltage VTH to a non-inverted input terminal (+) of the comparator 111. In addition, the threshold voltage VTH is suitably set according to the duration of waiting for the start of the switching action of the output transistor 101 and the synchronous rectification transistor 102.

A drain of the transistor 113 is connected to an output terminal of the error amplifier 103. A source of the transistor 113 is connected to a grounding terminal. A gate of the transistor 113 is connected to an application terminal (an output terminal of the comparator 111) of the mask signal MSK. Therefore, the transistor 113 is turned off when the mask signal MSK is at a low level, and is turned on when the mask signal MSK is at a high level. That is, the transistor 113 exerts the function as a switch element which, according to the mask signal MSK, enables turn-on/turn-off between the output terminal and the grounding terminal of the error amplifier 103.

Figure 5:
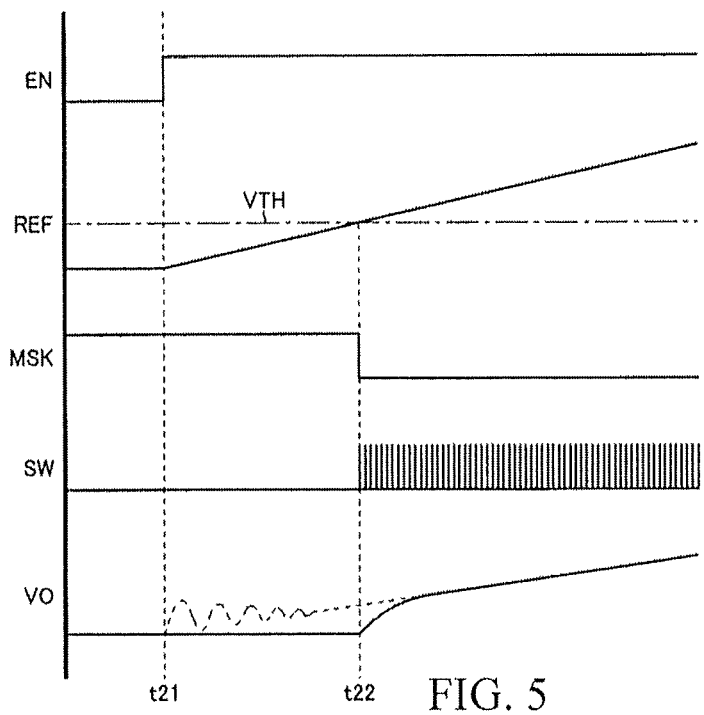
FIG. 5 is a sequence diagram of a start waveform according to the second embodiment.

FIG. 5 is a sequence diagram of a start waveform according to a second embodiment. Starting from the top, the actions of an enable signal EN, a reference voltage REF, a mask signal MSK, a switch voltage SW, and an output voltage VO are illustratively represented in sequence.

At time t21, if the enable signal EN is transitioned to a high level (a logic level when the action is allowed), the reference voltage REF in the reference voltage generation unit 104 starts to increase. At this time point, the reference voltage REF is lower than the threshold voltage VTH, so the mask signal MSK becomes a high level. Therefore, the transistor 113 is turned on, and the error voltage ERR is reduced to a zero value, so that the PWM signal (PWM) becomes a low level, and the switching action of the output transistor 101 and the synchronous rectification transistor 102 is kept at a stop state.

At time t21, the reference voltage REF starts to increase; at time t22, if the reference voltage REF exceeds a threshold voltage VTH, the mask signal MSK is transitioned to a low level. As a result, the transistor 113 is turned off, and the error voltage ERR is inputted in the PWM comparator 105, so that the switching action of the output transistor 101 and the synchronous rectification transistor 102 starts.

Therefore, in the second embodiment, the following structure is adopted: in the soft start duration of the current mode synchronous rectification DC/DC converter, for the duration until the voltage value of the reference voltage REF reaches a stable action area (=a target value of the output voltage VO capable of being stably output in a state that the power of the PWM signal (PWM) is set to a minimum value), the mask error voltage ERR waits for start of the switching action of the output transistor 101 and the synchronous rectification transistor 102. According to such a structure, fluctuations of the output voltage VO that occur when the reference voltage REF is relatively low can be avoided, thereby successfully increasing the output voltage VO gradually.

Third Embodiment

Figure 6:
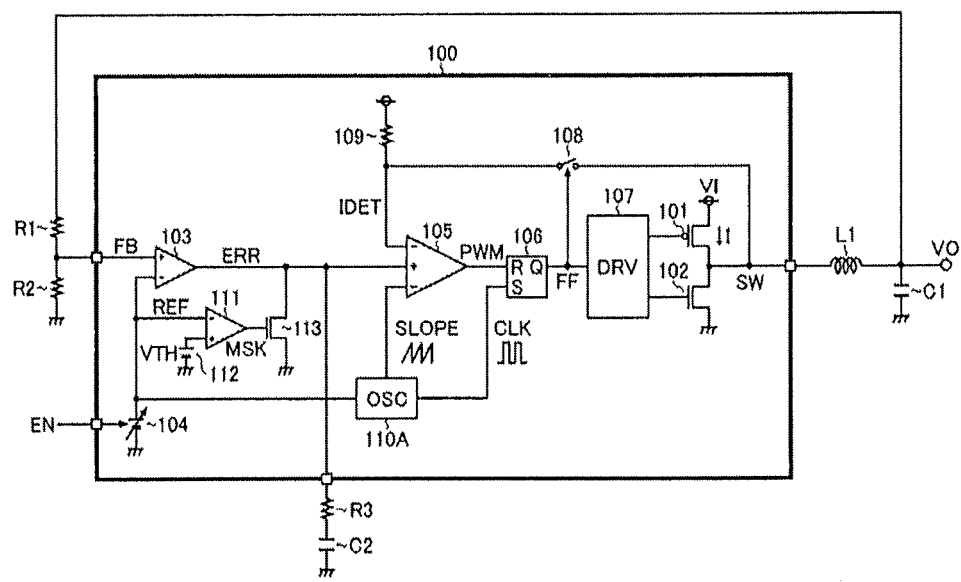
FIG. 6 is a block diagram of a current mode synchronous rectification DC/DC converter according to a third embodiment.
Figure 7:
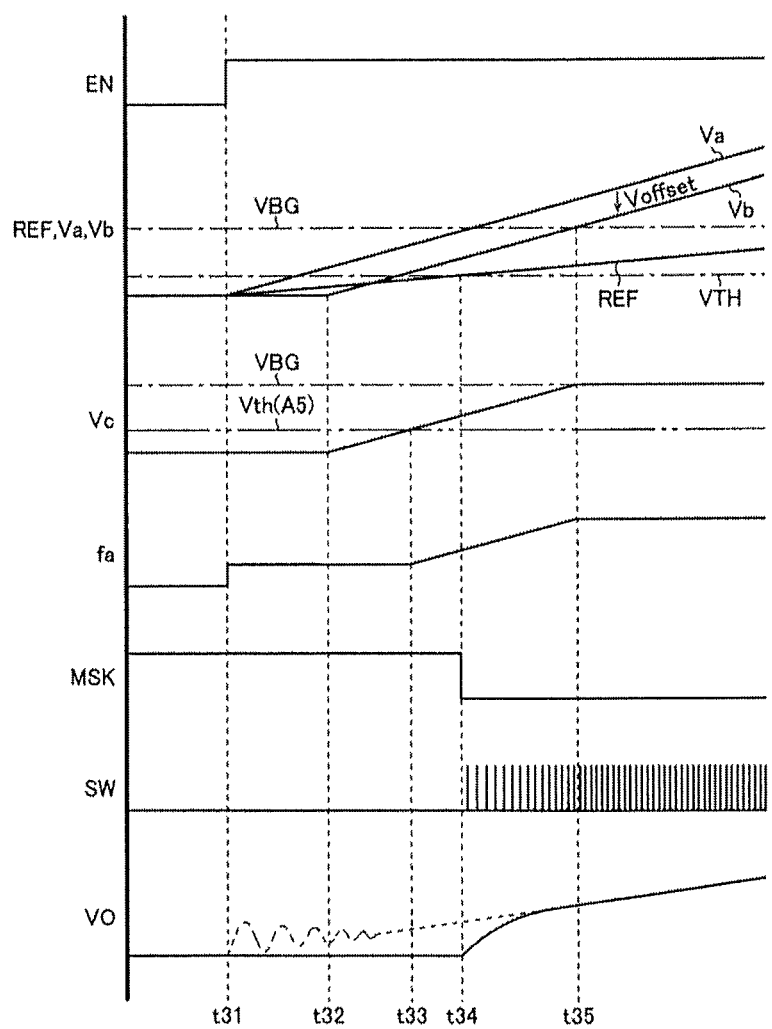
FIG. 7 is a sequence diagram of a start waveform according to the third embodiment.
Figure 8:
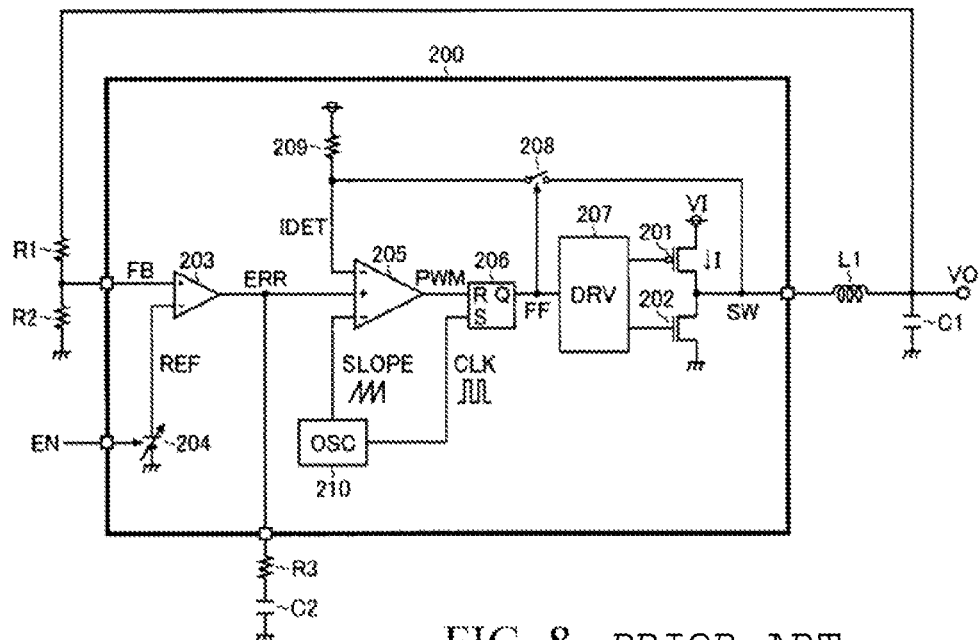
FIG. 8 is a block diagram of a current mode synchronous rectification DC/DC converter in a conventional example.
Figure 9:
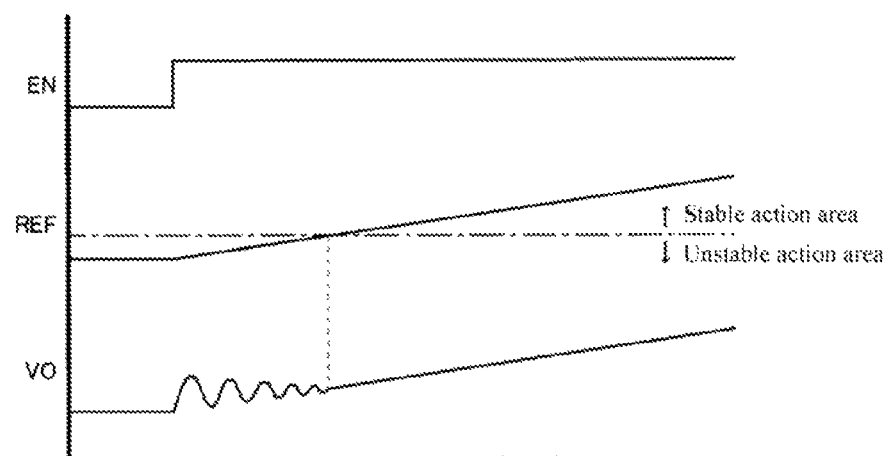
FIG. 9 is a sequence diagram of a conventional start waveform.

FIG. 6 is a block diagram of a current mode synchronous rectification DC/DC converter according to a third embodiment. The third embodiment has a stricture combining the first embodiment and the second embodiment. That is, the current mode synchronous rectification DC/DC converter in the third embodiment includes a frequency variable type oscillator 110A in FIG. 1 and includes a mask circuit (a comparator 111, a threshold voltage generation unit 112, and an N-channel type MOS field effect transistor 113) in FIG. 4.

FIG. 3 is a sequence diagram of a start waveform according to a third embodiment. Starting from the top, the actions of an enable signal EN, a reference voltage REF, a first voltage Va, a second voltage Vb, a third voltage Vc, an oscillation frequency fa, a mask signal MSK, a switch voltage SW, and an output voltage VO are illustratively represented in sequence.

At time t31, if the enable signal EN is transitioned to a high level (a logic level when the action is allowed), so that the reference voltage REF in the reference voltage generation unit 104 starts to increase, then the first voltage Va in the oscillator A1 starts to increase. On the other hand, the second voltage Vb is only reduced by a negative offset Voffset from the first voltage Va, so as to be kept at a zero value. At this time point, the second voltage Vb is lower than the band gap voltage VBG, so that the second voltage Vb (=0 V) is output as a third voltage Vc. Therefore, the transistor A5 is turned off, and no current signal Ia flows in the ring oscillator A6. Therefore, the oscillation frequencies fa of the clock signal CLK and the slope voltage SLOPE (further, the oscillation frequency of the switch voltage SW) are set to specific minimum values. Also, at this time point, the reference voltage REF is lower than the threshold voltage VTH, so that the mask signal MSK becomes high level. Therefore, the transistor 113 is turned on, and the error voltage ERR is reduced to a zero value, so that the PWM signal (PWM) becomes low level, and the switching actions of the output transistor 101 and the synchronous rectification transistor 102 are kept at a stop state.

At time t31, the first voltage Va starts to increase; at time t32, if an absolute value of the first voltage Va is greater than an absolute value of the offset voltage Voffset, the second voltage Vb starts to increase. However, for the duration until the third voltage Vc (=a second voltage Vb) exceeds a turn-on threshold voltage Vth(A5) of the transistor A5, the transistor A5 is turned off, and no current signal Ia flows in the ring oscillator A6, so that the oscillation frequencies fa of the clock signal CLK and the slope voltage SLOPE continue to be set to specific minimum values. Also, at this time point, the reference voltage REF is also lower than the threshold voltage VTH, so that the switching action of the output transistor 101 and the synchronous rectification transistor 102 is also kept at a stop state.

At time t32, the second voltage Vb starts to increase; at time t33, if the third voltage Vc (=a second voltage Vb) exceeds a turn-on threshold voltage Vth(A5) of the transistor A5, the conduction degree of the transistor A5 gradually increases. Therefore, after time t33, a current signal Ia supplied to the ring oscillator A6 gradually increases, so that the oscillation frequencies fa of the clock signal CLK and the slope voltage SLOPE gradually increases. However, at this time point, the reference voltage REF is also lower than the threshold voltage VTH, and the switching action of the output transistor 101 and the synchronous rectification transistor 102 is also kept at a stop state.

At time t31, the reference voltage REF starts to increase; at time t34, if the reference voltage REF exceeds a threshold voltage VTH, the mask signal MSK is transitioned to a low level. As a result, the transistor 113 is turned off, the error voltage ERR is inputted to a PWM comparator 105, so that the switching action of the output transistor 101 and the synchronous rectification transistor 102 starts. At this time point, the second voltage Vb is lower than the band gap voltage VBG; subsequently, therefore, the oscillation frequencies fa of the clock signal CLK and the slope voltage SLOPE gradually increase corresponding to the increase of the current signal Ia caused following the increase of the second voltage Vb.

At time t34, the switching action of the output transistor 101 and the synchronous rectification transistor 102 starts; at time t35, if the second voltage Vb exceeds a band gap voltage VBG, the band gap voltage VBG is output as a third voltage Vc. Therefore, after time t35, the current signal Ia supplied to the ring oscillator A6 is fixed at a current value (={VBG−Vth(A5)}/Rc) corresponding to the band gap voltage VBG, so the to oscillation frequencies fa of the clock signal CLK and the slope voltage SLOPE are fixed at oscillation frequencies (that is, oscillation frequencies at a normal action) corresponding to the band gap voltages VBG.

However, in the third embodiment, the implementation is made by combining the structure in the first embodiment and the structure in the second embodiment, so the third embodiment definitely has the above functions and effects (inhibiting the fluctuations of the output voltage VO), and may greatly shorten the duration of waiting for start of a switching action or the duration of reduction of a drive frequency, so the output voltage VO is transitioned to a stable state more rapidly.

<Other Variations>

In addition, the above embodiments illustrate that the present invention is applied to the voltage drop type DC/DC converter capable of reducing the input voltage to generate a required output voltage. However, the application objects of the present invention are not limited thereto, and the present invention may also be applied to a voltage boost type or a voltage boost/drop type DC/DC converter.

Also, in addition to the above embodiments, various changes may be made to the structure of the present invention without departing from the scope of the invention. That is, it should be noted that the above disclosed aspects of the embodiment are all exemplary and not limitative, and the technical range of the present invention is represented by the claims instead of the illustration of the embodiment, and includes all modifications in terms of concept and scope equivalent to those defined in the claims.

The present invention is a technology which may be preferably utilized to implement stable start of a current mode synchronous rectification DC/DC converter.

What is claimed is:

1. A current mode synchronous rectification DC/DC converter comprising:
    a soft start function unit, for inhibiting a target value of an output voltage to be lower than that at a normal action while starting;
    an output stabilization function unit, for performing at least one of waiting for start of a switching action and reduction of a drive frequency while starting;
    an output transistor and a synchronous rectification transistor, for generating the output voltage from an input voltage according to turn-on/turn-off control thereof complementary to each other;
    a reference voltage generation unit, for generating a reference voltage;
    an error amplifier, for amplifying a difference between a feedback voltage corresponding to the output voltage and the reference voltage and generating an error voltage;
    a current detection unit, for generating a current detection voltage corresponding to an output current;
    an oscillator, for generating a clock signal and a slope voltage with the same oscillation frequency, the oscillator further comprising:
    an amplification unit, for generating a first voltage acquired by amplifying the reference voltage;
    an offset setting unit, for enabling the first voltage to produce an offset and thereby generating a second voltage;
    a band gap voltage generation unit, for generating a band gap voltage;
    a buffer, for generating a third voltage in the same manner as a lower one of the second voltage and the band gap voltage;
    a voltage/current conversion unit, for converting the third voltage into a current signal;
    a ring oscillator, for generating the clock signal through an oscillation frequency corresponding to the current signal; and
    a slope voltage generation unit, for generating the slope voltage from the clock signal,
    the current mode synchronous rectification DC/DC converter further comprising:
    a Pulse Width Modulation (PWM) comparator, for generating a PWM signal according to a comparison result of the error voltage and the slope voltage, and a comparison result of the error voltage and the current detection voltage;
    a reset-set (RS) trigger, for generating a latch signal set through the clock signal and reset through the PWM signal;
    a driver, for generating gate voltages of the output transistor and the synchronous rectification transistor according to the latch signal; and
    wherein the reference voltage generation unit, as the soft start function unit, enables the reference voltage to slowly increase while starting, and wherein the oscillator, as the output stabilization function unit, generates the clock signal and the slope voltage through the oscillation frequency corresponding to the reference voltage.

2. The current mode synchronous rectification DC/DC converter according to claim 1, wherein the voltage/current conversion unit comprises an npn type bipolar transistor, a base of the npn type bipolar transistor is connected to an output terminal of the buffer, an emitter is grounded through a resistor, and a collector is connected to the ring oscillator.

3. The current mode synchronous rectification DC/DC converter according to claim 1, comprising a mask circuit, wherein the mask circuit, as the output stabilization function unit, masks the error voltage in a period until the reference voltage reaches a specific threshold voltage.

4. The current mode synchronous rectification DC/DC converter according to claim 3, wherein the mask circuit comprises:
    a threshold voltage generation unit, for generating the threshold voltage;
    a comparator, for comparing the reference voltage with the threshold voltage; and
    a transistor, for enabling turn-on/turn-off between an output terminal and a grounding terminal of the error amplifier according to an output of the comparator.

5. The current mode synchronous rectification DC/DC converter according to claim 2, comprising a mask circuit, wherein the mask circuit, as the output stabilization function unit, masks the error voltage in a period until the reference voltage reaches a specific threshold voltage.

6. The current mode synchronous rectification DC/DC converter according to claim 5, wherein the mask circuit comprises:
    a threshold voltage generation unit, for generating the threshold voltage;
    a comparator, for comparing the reference voltage with the threshold voltage; and
    a transistor, for enabling turn-on/turn-off between an output terminal and a grounding terminal of the error amplifier according to an output of the comparator.

7. The current mode synchronous rectification DC/DC converter according to claim 1, wherein the current detection unit further comprises:
    a switch, having a terminal connected to a connection node between the output transistor and the synchronous rectification transistor, and the other terminal connected to an output terminal of the current detection voltage; and a pull up resistor, having a terminal connected to the output terminal of the current detection voltage, and the other terminal connected to an application terminal of a power supply voltage.

8. The current mode synchronous rectification DC/DC converter according to claim 2, wherein the current detection unit comprises:
   a switch, having a terminal connected to a connection node between the output transistor and the synchronous rectification transistor, and the other terminal connected to an output terminal of the current detection voltage; and
   a pull up resistor, having a terminal connected to the output terminal of the current detection voltage, and the other terminal connected to an application terminal of a power supply voltage.

9. The current mode synchronous rectification DC/DC converter according to claim 1, comprising:
   an inductor, having a terminal connected to a connection node between the output transistor and the synchronous rectification transistor, and the other terminal connected to an output terminal of the output voltage; and
   a capacitor, having a terminal connected to the output terminal of the output voltage, and the other terminal connected to the grounding terminal;
   wherein the input voltage is reduced to generate the output voltage.

10. The current mode synchronous rectification DC/DC converter according to claim 2, comprising:
    an inductor, having a terminal connected to a connection node between the output transistor and the synchronous rectification transistor, and the other terminal connected to an output terminal of the output voltage; and
    a capacitor, having a terminal connected to the output terminal of the output voltage, and the other terminal connected to the grounding terminal;
    wherein the input voltage is reduced to generate the output voltage.

11. A current mode synchronous rectification DC/DC converter, comprising:
    an output transistor, for generating an output voltage from an input voltage according to a turn-on/turn-off control;
    a reference voltage generation unit, for generating a reference voltage;
    an error amplifier, for amplifying a difference between a feedback voltage corresponding to the output voltage and the reference voltage and generating an error voltage;
    an oscillator, for generating a slope voltage;
    a Pulse Width Modulation (PWM) comparator, for generating a PWM signal according to a comparison result of the error voltage and the slope voltage;
    a driver, for generating a gate voltage of the output transistor according to the PWM signal;
    a soft start function unit, for inhibiting a target value of an output voltage to be lower than that at a normal action while starting; and
    a mask circuit, masking the error voltage in a period until the reference voltage reaches a specific threshold voltage while starting.

12. The current mode synchronous rectification DC/DC converter according to claim 11, wherein the mask circuit comprises:
    a threshold voltage generation unit, for generating the threshold voltage;
    a comparator, for comparing the reference voltage with the threshold voltage; and
    a transistor, for enabling turn-on/turn-off between an output terminal and a grounding terminal of the error amplifier according to an output of the comparator.

* * * * *